(12) United States Patent
Ryu

(10) Patent No.: US 10,928,292 B2
(45) Date of Patent: Feb. 23, 2021

(54) DUST SENSOR

(71) Applicant: HITACHI-LG DATA STORAGE KOREA, INC., Seoul (KR)

(72) Inventor: Jaeyong Ryu, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 119 days.

(21) Appl. No.: 16/196,565

(22) Filed: Nov. 20, 2018

(65) Prior Publication Data

US 2019/0195766 A1 Jun. 27, 2019

(30) Foreign Application Priority Data

Dec. 22, 2017 (KR) .................. 10-2017-0178235

(51) Int. Cl.
*G01N 15/06* (2006.01)
*G01N 21/47* (2006.01)
*G01N 21/94* (2006.01)
*G01N 15/00* (2006.01)
*G01N 21/53* (2006.01)

(52) U.S. Cl.
CPC .............. *G01N 15/06* (2013.01); *G01N 21/47* (2013.01); *G01N 21/94* (2013.01); *G01N 21/53* (2013.01); *G01N 2015/0046* (2013.01); *G01N 2015/0693* (2013.01)

(58) Field of Classification Search
CPC .... G01N 15/0205; G01N 21/47; G01N 15/06; G01N 21/53; G01N 21/532
See application file for complete search history.

(56) References Cited

U.S. PATENT DOCUMENTS 10,006,846 B2 * 6/2018 Karakaya ................. G01N 5/02
2015/0077737 A1 * 3/2015 Belinsky .............. G08B 17/103
356/51

* cited by examiner

*Primary Examiner* — Rebecca C Bryant
(74) *Attorney, Agent, or Firm* — Birch, Stewart, Kolasch & Birch, LLP

(57) ABSTRACT

The present invention provides a dust sensor comprising: a sensor module for receiving light scattered by dust particles and outputting an electric signal; a communication module for communicating with an external device; a memory for storing region information in association with particle density data; and a control unit for calculating a volume of the dust particles based on the signal output from the sensor module, obtaining the region information for a location where the dust sensor is installed via the communication module, retrieving the particle density data corresponding the obtained region information from the memory, calculating dust concentration using the retrieved particle density data and the calculated volume, and outputting the calculated dust concentration. The memory may store the region information in association with air quality reference data.

9 Claims, 4 Drawing Sheets

| Item | Air quality Judgment | Korea | US/Japan | China | WHO |
|---|---|---|---|---|---|
| PM$_{2.5}$ (μg/m³) | Bad | 50 | 35 | 75 | 25 |
| | Normal | 25 | 15 | 35 | 10 |

$S = (T1+T2+ \cdots +T8)/T_{op}$

DUST SENSOR

This application claims the benefit of priority under 35 U.S.C. § 119(a) to Korean Patent Application No. 10-2017-0178235 filed on Dec. 22, 2017, which is incorporated by reference herein in its entirety.

BACKGROUND

Field

The present invention relates to a dust sensor.

Related Art

As the population increases and the number of vehicles increases, air pollution becomes worse. There is a growing interest in dust, and air purifier demand is also increasing. For active air cleaning, an air cleaner needs a dust sensor to measure the degree of air pollution, that is, dust concentration in air.

As a dust sensor, a photoelectric dust sensor is mainly used. FIG. 1 conceptually shows the principle in which a photoelectric dust sensor senses a dust concentration.

The dust sensor of the photoelectric type comprises an air inlet and an outlet in a housing, passes air flowing from the air inlet through an air passage path, and discharges the air through the air outlet. The dust sensor emits light toward the air passage path via a light emitting unit disposed in the air passage path, collects the light radiated by the light emitting unit and then scattered by dusts included in the air via a light receiving unit disposed in the air passage path, and measures the concentration of dust contained in the air by using an electric signal of the light receiving unit.

If there is little dust or smoke in the air passing through the air passage path, almost all the light emitted from the light emitting unit reaches a light shielding region where the light receiving portion is not disposed, so the amount of light received by the light receiving unit becomes very small. On the other hand, if there is some dust or smoke in the air passing through the air passage path, a part of the light radiated from the light emitting unit is reflected by the dust or smoke in the air passage path and is incident on the light receiving unit, and the light receiving amount of the light receiving unit is increased.

Thus, it is possible to detect the presence/absence of dust or smoke passing through the air passage path based on the fluctuation of the output signal of the light receiving element (or photo detector) included in the light receiving unit, and it is possible to detect the concentration of dust or smoke passing through the air passage path based on the output level of the light receiving element.

Meanwhile, the dust concentration is defined as the total weight of the dust particles included in the unit volume.

The scattered light incident on a light receiving unit is proportional to the size or volume of the dust particles contained in the air passage path, and the level of the output signal of the photo detector is also proportional to the volume of the dust particles. So the level of the output signal of a photo detector decreases when particles of large volume pass, and the level of the output signal of the photo detector decreases when particles of small volume pass.

Therefore, the dust sensor confirms the volume occupied by the dust particles from the output signal and converts it into a dust concentration. The dust sensor compares the output signal of the photo detector with a threshold voltage of a predetermined level to calculate a time ratio of the output signal equal to or greater than the cut-off threshold voltage, determines the total volume occupied by the dust particles contained in the air passing through the air passage, path, and calculates the dust concentration by multiplying the total volume by the density of the dust particles, The density of dust particles varies from region to region. For example, the dry desert region of northern China has a density of ultrafine dust particles of 2.1 μm in size, while a density of ultrafine dust particles of 2.1 μm in size in Korea is 1. Therefore, in order to accurately calculate the dust concentration, it is necessary to apply the density of the particle in the region where the dust concentration is measured.

However, at present, even if measuring the total volume of the dust particles included in the air in a similar manner to an actual value, the conventional dust sensor applies the basic density value set in the sensor to the dust concentration calculation without sufficiently considering the density deviation of the dust particles in individual regions. So, when measuring dust concentrations in different areas with a dust sensor that has been calibrated based on one area, it often differs from the dust concentration actually measured by a standard equipment.

Further, as shown in FIG. 2, the dust density, which is a standard for judging air quality for each region, is different from each other. When air quality is judged and displayed based on the dust concentration measured by an air purifier including a dust sensor, there may arise a problem of displaying a result that does not correspond to an installed region.

SUMMARY

Accordingly, the present invention has been made in view of such circumstances, and an object of the present invention is to provide a dust sensor that calculates a dust concentration close to an actual value by reflecting a dust characteristic.

A dust sensor according to an embodiment of the present invention may comprise: a sensor module for receiving light scattered by dust particles and outputting an electric signal; a communication module for communicating with an external device; a memory for storing region information in association with particle density data; and a control unit for calculating a volume of the dust particles based on the signal output from the sensor module, obtaining the region information for a location where the dust sensor is installed via the communication module, retrieving the particle density data corresponding the obtained region information from the memory, calculating dust concentration using the retrieved particle density data and the calculated volume, and outputting the calculated dust concentration.

In an embodiment, the sensor module may comprise a light emitting unit for emitting light and a light receiving unit for receiving the light scattered by the dust particles and outputting an electric signal proportional to a quantity of the received light.

In an embodiment, the communication module may connect the dust sensor to the external device supporting a short-range wireless communication.

In an embodiment, the memory may store the region information in association with air quality reference data.

In an embodiment, the entire world may be divided into a plurality of zones by grouping adjacent regions, and the memory may store representative values of the particle density data and the air quality reference data for each of the divided zones in an associated manner.

In an embodiment, the memory may store data for a standard zone among the plurality of zones, and store difference value with respect to the data in the standard zone for each of remaining zones.

In an embodiment, the control unit may compare the calculated dust concentration with the air quality reference data and output a comparing result to a voice or a screen.

In an embodiment, the control unit may obtain the region information from a value set in a dip switch in preparation for a case in which the region information cannot be obtained through the communication module.

A dust concentration sensing method according to another embodiment of the present invention may comprise: extracting region information from data transmitted from an external device through a communication module; obtaining a particle density value corresponding the extracted region information by searching a memory; calculating a volume of the dust particles included in air of a unit volume from a signal output from a sensor module; and calculating a dust concentration by multiplying the calculated volume and the obtained particle density value.

Therefore, the measurement accuracy of the dust sensor is improved and the reliability is increased.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figures 1, 2:
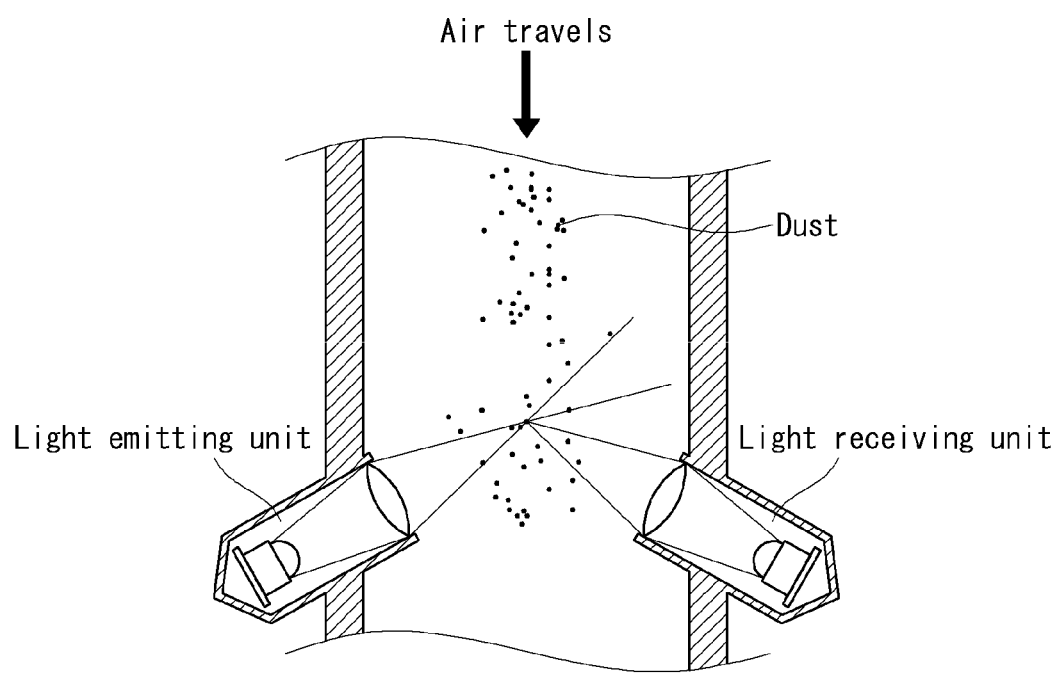
FIG. 1 conceptually shows the principle in which a photoelectric dust sensor senses a dust concentration.
FIG. 2 shows fine dust judgment standards for each country.

Hereinafter, preferred embodiments of the present invention will be described in detail with reference to the accompanying drawings. Same reference numerals throughout the specification denote substantially identical components. In the following description, a detailed description of known functions and configurations incorporated herein will be omitted when it may make the subject matter of the present invention rather unclear.

The photoelectric type dust sensor is a device of measuring dust density by receiving the light scattered from fine particles such as dust contained in air via a light receiving element and outputting an electric signal.

Figure 3:
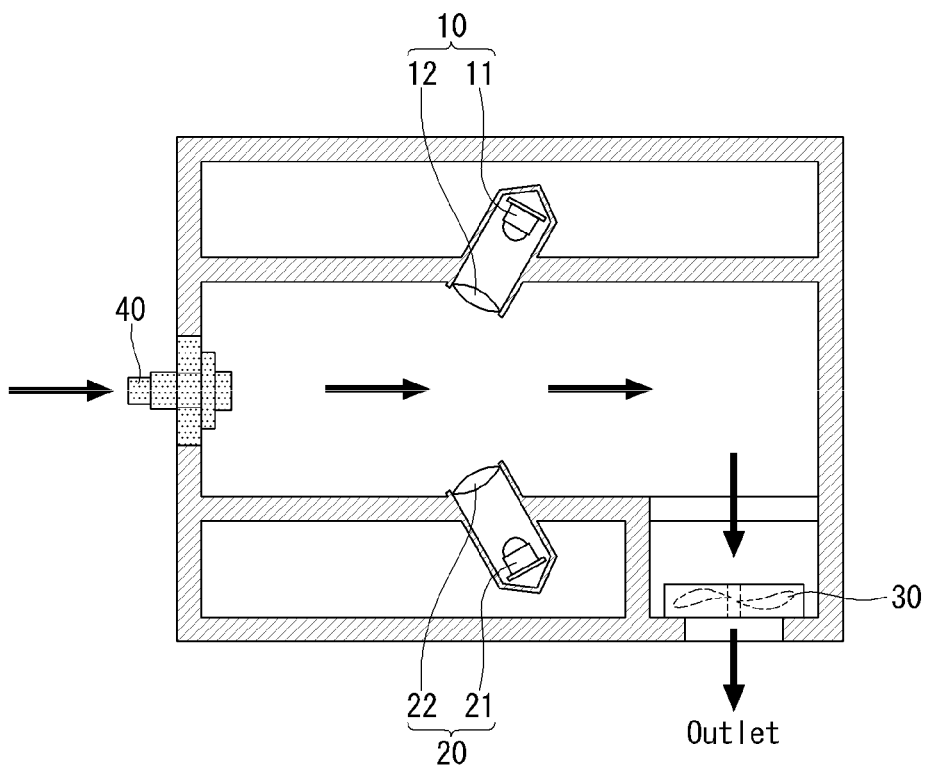
FIG. 3 shows a general configuration of a photoelectric dust sensor.

FIG. 3 shows a general configuration of a photoelectric dust sensor.

The dust sensor may comprise a light emitting unit 10 for emitting light in an air passage path inside the dust sensor and a light receiving unit 20 for collecting light scattered by dust contained in the air flowing through the air passage path, and may further comprise a fan 30 for generating a suction force for allowing air to flow into the air passage path. The fan 30 may be omitted if air flows from the outside at a predetermined pressure.

The dust sensor may further include a maze to confine the light in order to prevents the light, which is irradiated by the light emitting unit 10 and passes through the detection range of the light receiving unit 20 without colliding with dust or particles, from being reflected on the wall surface constituting the detection space and returning to the light receiving unit 20 or the light emitting unit 10 The light that has passed through the detection range of the light receiving unit 20 without being hit by dust or particles irradiated by the light emitting unit 10 is prevented from being reflected by the wall surface constituting the detection space to return to the light receiving unit 20 or the light emitting unit 10. The maze may be arranged to face the light emitting unit 10.

The dust sensor may further include a connector (not shown) for connecting to the controller for controlling the operation of the dust sensor. The dust sensor receives control signals for driving the light emitting unit 10, the light receiving unit 20 and the fan 30 from the controller through the connector and transmits the output signal of the light receiving unit 20 to the controller.

The light emitting unit 10 may comprise a light source 11 for radiating light of a predetermined band and a source lens 12 for converting the light radiated by the light source 11 into parallel light. The light source 11 may be a laser diode LD or a light emitting diode LED. The light source lens may be a collimating lens for converting divergent light into parallel light or a convex lens for converting parallel light into convergent light.

The light receiving unit 20 may comprise a light receiving element or photo detector 21 for generating an electric signal proportional to the amount of incident light, and a receiving lens 22 for condensing incident light on the light receiving element.

The light emitting unit 10 emits light to the air passage path, and the light emitting unit 10 and the light receiving unit 20 may be mounted in a state where they are staggered from each other at a predetermined angle with respect to the traveling direction of air, in order for the light emitted from the light emitting unit 10 not to be directly received by the light receiving unit 20. Or the light emitting unit 10 and the light receiving unit 20 may be disposed at right angles to each other. In this case, the direction in which the light emitting unit 10 emits light and the direction perpendicular to the surface on which the light receiving unit 20 receives light may be perpendicular to each other.

The fan 30 is driven under the control of the controller so as to generate a suction force such that air flows at a constant speed or pressure in the air passage path. The fan 30 may be disposed at the end of the air passage path, that is, near an air outlet.

The light emitting unit 10 radiates light in a periodic pulse shape, and the light receiving unit 20 converts the light incident on a photo detector 21 into an electric signal and outputs the electric signal proportional to the quantity of the incident light.

In the photoelectric dust sensor, even if there is no dust in the air passing through an air passage path, the light radiated from the light emitting unit 10 is irregularly reflected inside the sensor and a small amount of light is received by the light receiving unit 20. So, the level of the output signal of the photo detector 21 has a constant value even if there is no dust. The photo detector 21 outputs a signal whose level changes in proportion to the size or volume of the dust particles contained in the air passing through the air passage.path.

Figure 4:
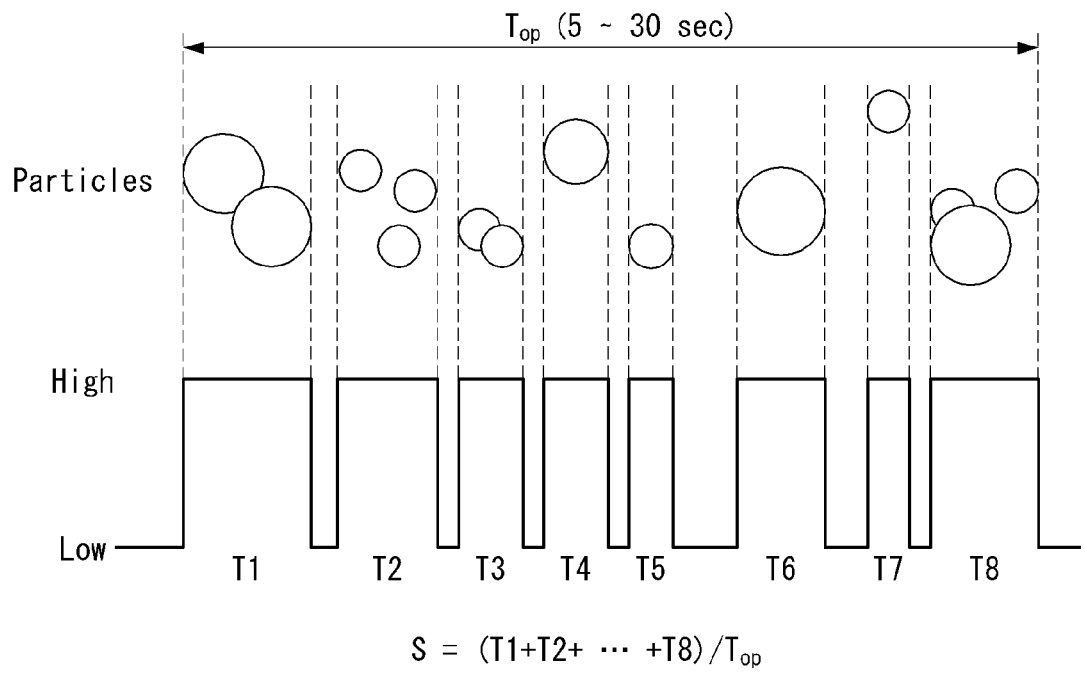
FIG. 4 shows the relationship between dust and a signal in a dust sensor using scattered light.

FIG. 4 shows the relationship between dust and a signal in a dust sensor using scattered light. FIG. 4 shows a result of outputting the output signal of the photo detector 21 at a logic high and a logic low, respectively, with a threshold voltage of a predetermined level as a reference.

The dust sensor may obtain the sum of the time lengths of the sections (T1+T2+ . . . +T8 in FIG. 4) that become logic high in the result of cutting the output signal of the photo detector 21 to the threshold voltage for a predetermined operation time Top, for example, 5 to 30 seconds, divide it by the operation time Top to obtain the volume ratio S of the dust particles contained in the air and the air passing through the air passage path, and multiply it by the density of the dust particles to obtain the dust concentration. Since the volume of the air injected during the operation time Top can be known and the total volume of the dust particles contained in the air injected during the operation time Top can be known from the output signal, the volume ratio of the dust particles contained in the air of the unit volume can be calculated.

When calculating the dust concentration by multiplying the measured value outputted by a dust sensor by a dust density, the present invention determines the region where the dust sensor operates and reflects the dust characteristic of the region to improve the accuracy of the dust concentration.

To this end, the device including the dust sensor or the dust sensor module to which the present invention is applied may be connected to the external device having an IoT (Internet of Things) function through a communication module, obtains region information such as a zip code from the external device, search the link information, that associates region information with dust density data and air quality judgment reference data and is stored in a memory, for the value corresponding to the region information, calculate dust concentration by applying the searched value, judge air quality, and output the calculated dust concentration and the determined air quality through voice, screen or other device.

Figure 5:
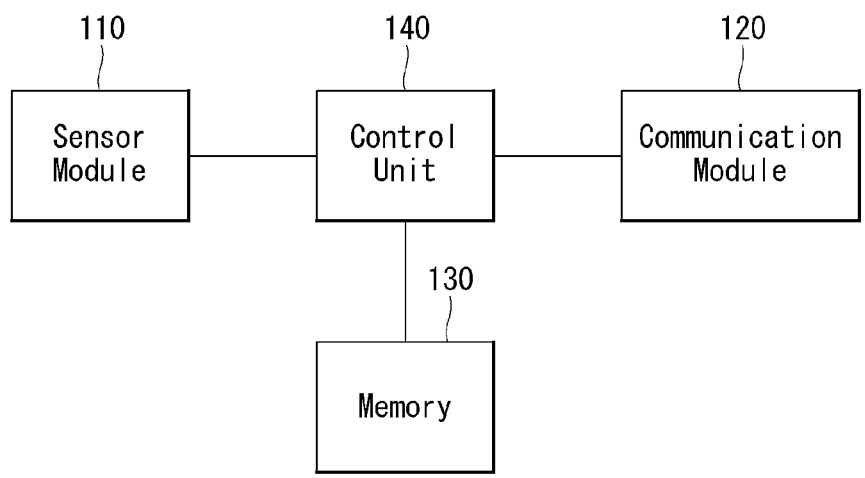
FIG. 5 is a functional block diagram of a dust sensor according to the present invention.

FIG. 5 is a functional block diagram of a dust sensor according to the present invention.

The dust sensor according to the present invention may comprise a sensor module 110, a communication module 120, a memory 130 and control unit 140.

The sensor module 110 is a photoelectric sensor module for receiving the light scattered by dust particles and outputting electric signals, and may be configured as FIG. 3.

The c module 120 is for communicating with an external device to exchange data, and may be use a module to which a short-range low-power wireless communication technology such as Bluetooth, ZigBee, etc. is applied.

The memory 130 is for storing the region information in association with the particle density data and the air quality reference data, and may store the linkage information for a plurality of areas. Instead of storing all of the association information for each of the plurality of regions, in a state that the entire world is divided into a plurality of zones by grouping adjacent area codes, the memory 130 may store only representative data for each of the divided zones. Also, the memory 130 may store only the data for a standard zone, and may store only the difference value with respect to the data in the standard zone for the remaining zones.

The control unit 140 calculates the total volume of the dust particles contained in the air of a unit volume (the volume ratio of particles contained in the air and the air is calculated) based on the signal output from the sensor module 110, receives region information, for example, a zip code for a location where the dust sensor is installed from an external device through the communication module 120, searches the memory 130 for density data and air quality reference data associated with the area coinciding with the received region information, calculates dust concentration using the searched data, determines whether the air quality is good or bad, and outputs the calculation and the determination result on a screen, voice, or the like, or transmit it to the outside.

The dust sensor may further include a dip switch for directly inputting the area code in preparation for the case in which wireless communication is impossible through the communication module. The control unit 140 may check the area code based on the input value of the dip switch, and calculate the dust concentration based on the area code, When the dust sensor is directly mounted on a host such as an air cleaner or an air conditioner, the communication module 120, the memory 130, and the control unit 140 may be coupled to the host and perform their functions. When the host is connected to the external Internet through a wired network, the communication module 120 does not need to use the wireless communication technology.

Figure 6:
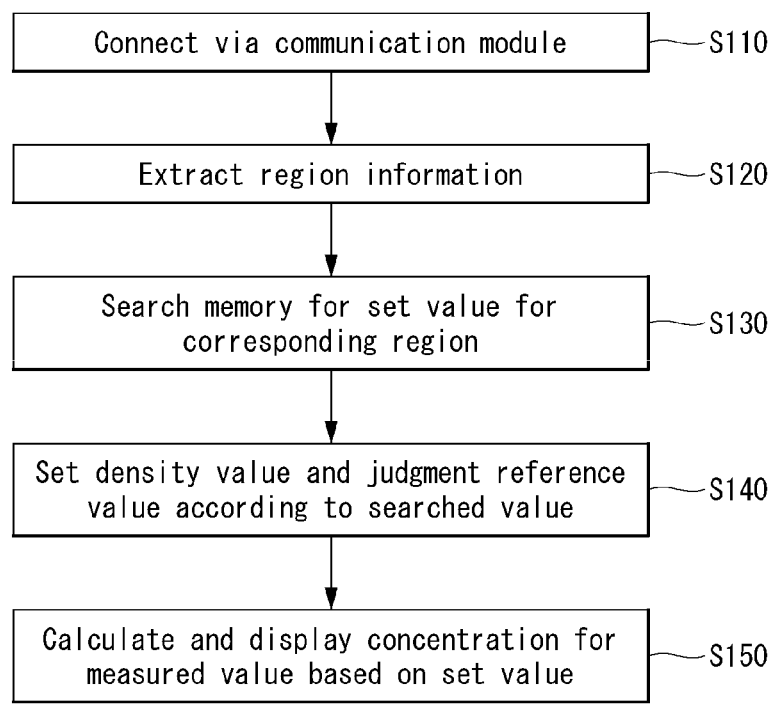
FIG. 6 is a flowchart illustrating a method of correcting regional deviation of a dust sensor according to an exemplary embodiment of the present invention.

FIG. 6 is a flowchart illustrating a method of correcting regional deviation of a dust sensor according to an exemplary embodiment of the present invention.

When the power of the dust sensor is turned on, the control unit 140 controls the communication module 120 to connect to the external device to which the Internet is connected (S110). A zip code is registered in an external device equipped with the IoT function and the external device can transmit region information through wired/wireless communication.

The control unit 140 extracts region information from data transmitted from an external device through the communication module 120 (S120). The control unit 140 may obtain region information from the value set in the dip switch mounted on the dust sensor when the communication module 120 is not connected to an external device, that is, when the region information cannot be obtained through the communication module 120.

The control unit 140 searches the memory 130 for particle density data and air quality reference data corresponding to the extracted region information (S130). The control unit 140 may search for the area corresponding to the extracted area information and search for a set value (dust particle density and air quality judgment reference) of the area.

The control unit 140 sets the dust particle density value and the air quality reference value according to the searched value (S140).

The controller 140 calculates the total volume of the dust particles contained in the air of a unit volume from the signal output from the sensor module 110, for example, using the method described with reference to FIG. 4. The calculated value is the volume ratio of air and particles contained in the air.

The control unit 140 may calculate the concentration of the dust contained in the air by multiplying the volume ratio and the set particle density value, and display it on the display (not shown) (S150). The control unit 140 may output the calculated dust concentration by voice or transmit the data to the connected external device.

The control unit 140 may compare the calculated dust concentration with a set air quality reference value to determine whether the air quality is good or bad, and output the determination result to a voice, a screen, or the like.

The dust sensor according to the present invention may calculate the total volume of dust particles contained in the air of a unit volume based on a signal output from the sensor module 110, receive region information, for example, a zip code for a location where the dust sensor is installed from an external device through the communication module 120, retrieve, from the memory 130, the density data and the air quality reference data associated with the region coinciding with the received region information, calculate the dust concentration using the retrieved data, judge whether the air quality is good or bad, and output the calculation and judgment result on the screen, voice or the like or transmit it to the outside.

Therefore, by compensating the measurement error of the photoelectric dust sensor by reflecting the dust characteristic for each region of the world, it is possible to solve the problem that the measurement error occurs in each measurement region, and to improve the measurement accuracy and reliability. In addition, there is no need to manually set the dust sensor to fit the installation location, and even when the installed location of the dust sensor is changed, the dust concentration is outputted to match the changed location.

Throughout the description, it should be understood by those skilled in the art that various changes and modifications are possible without departing from the technical principles of the present invention. Therefore, the technical scope of the present invention is not limited to the detailed descriptions in this specification but should be defined by the scope of the appended claims.

What is claimed is:

1. A dust sensor, comprising:
   a sensor module for receiving light scattered by dust particles and outputting an electric signal;
   a communication module for communicating with an external device;
   a memory for storing region information in association with particle density data; and
   a control unit for calculating a volume of the dust particles based on the signal output from the sensor module, obtaining the region information for a location where the dust sensor is installed via the communication module, retrieving the particle density data corresponding the obtained region information from the memory, calculating dust concentration using the retrieved particle density data and the calculated volume, and outputting the calculated dust concentration.

2. The dust sensor of claim 1, wherein the sensor module comprises:
   a light emitting unit for emitting light; and
   a light receiving unit for receiving the light scattered by the dust particles and outputting an electric signal proportional to a quantity of the received light.

3. The dust sensor of claim 1, wherein the communication module connects the dust sensor to the external device supporting a short-range wireless communication.

4. The dust sensor of claim 1, wherein the memory stores the region information in association with air quality reference data.

5. The dust sensor of claim 4, wherein the entire world is divided into a plurality of zones by grouping adjacent regions, and the memory stores representative values of the particle density data and the air quality reference data for each of the divided zones in an associated manner.

6. The dust sensor of claim 5, wherein the memory stores data for a standard zone among the plurality of zones, and stores difference value with respect to the data in the standard zone for each of remaining zones.

7. The dust sensor of claim 4, wherein the control unit compares the calculated dust concentration with the air quality reference data and outputs a comparing result to a voice or a screen.

8. The dust sensor of claim 1, wherein the control unit obtains the region information from a value set in a dip switch in preparation for a case in which the region information cannot be obtained through the communication module.

9. A dust concentration sensing method, comprising:
   extracting region information from data transmitted from an external device through a communication module;
   obtaining a particle density value corresponding the extracted region information by searching a memory;
   calculating a volume of the dust particles included in air of a unit volume from a signal output from a sensor module; and
   calculating a dust concentration by multiplying the calculated volume and the obtained particle density value.

* * * * *